United States Patent [19]

Bowersmith

[11] 3,946,893

[45] Mar. 30, 1976

[54] DOUBLE PAN UTENSIL FOR BAKING CAKES WITH WATER INSULATION HELD BETWEEN THE SPACED APART SIDE WALLS OF THE TWO PANS

[76] Inventor: William R. Bowersmith, 33311 - 13th St., Union City, Calif. 94587

[22] Filed: Aug. 30, 1974

[21] Appl. No.: 502,152

[52] U.S. Cl. .................... 220/13; 126/281; 220/17; 220/94 R; 220/318
[51] Int. Cl.² A47J 24/10; B65D 25/18; B65D 25/28
[58] Field of Search ............. 220/13, 17, 94 R, 318, 220/324; 120/281

[56] References Cited
UNITED STATES PATENTS

| | | | |
|---|---|---|---|
| 366,968 | 7/1887 | McClane | 220/13 X |
| 557,672 | 4/1896 | Hartung | 220/17 X |
| 817,499 | 4/1906 | Marshall | 126/281 |
| 1,152,308 | 8/1915 | Evans | 220/13 |
| 1,187,498 | 6/1916 | Castle | 220/17 |
| 1,296,423 | 3/1919 | Neef | 220/13 |
| 1,361,364 | 12/1920 | Burlingham | 220/17 X |
| 1,683,305 | 9/1928 | Rojenheimer, Jr. | 220/13 |
| 3,080,996 | 3/1963 | Graham | 220/318 |
| 3,471,054 | 10/1969 | Ostrowsky et al. | 220/318 |
| 3,724,711 | 4/1973 | George et al. | 220/17 X |

Primary Examiner—William Price
Assistant Examiner—Stephen Marcus
Attorney, Agent, or Firm—William R. Piper

[57] ABSTRACT

An inner cake pan is removably receivable in an outer pan whose side walls are spaced from the side walls of the inner pan for providing a water receiving space surrounding the inner pan side walls for insulating these walls from the oven heat during the baking of the cake. Novel locking means secures the two pans together so that the bottom of the inner pan contacts the bottom of the outer pan and, therefore, the inner pan bottom will be heated more rapidly than its side walls which are kept at a lower temperature than the bottom because of the insulating layer of water encompassing the inner pan side walls. Also, the releasing of the locking means at the end of the cake baking period will cause the water in the outer pan to float the inner pan and raise it for ready removal from the outer pan.

2 Claims, 8 Drawing Figures

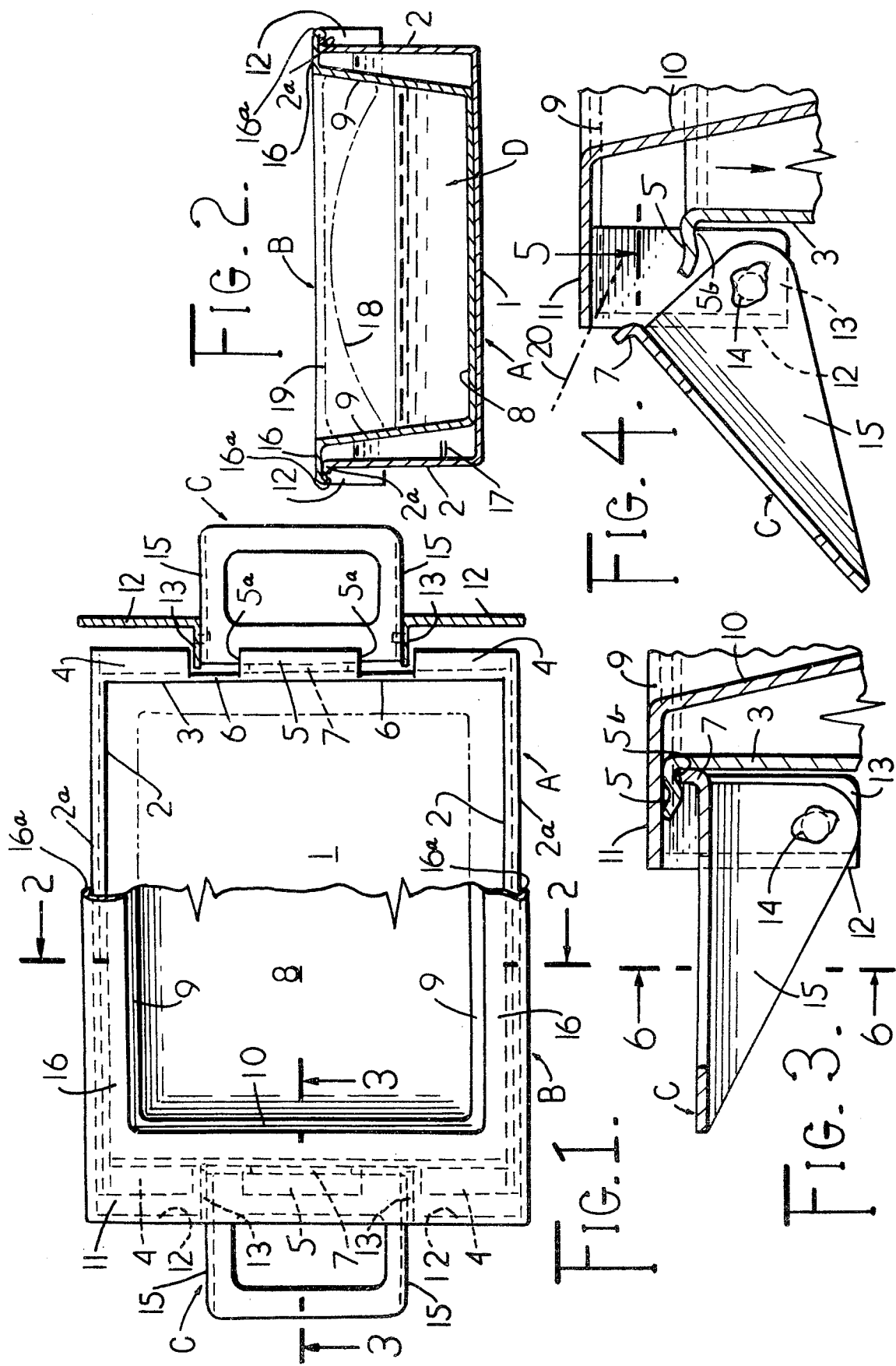

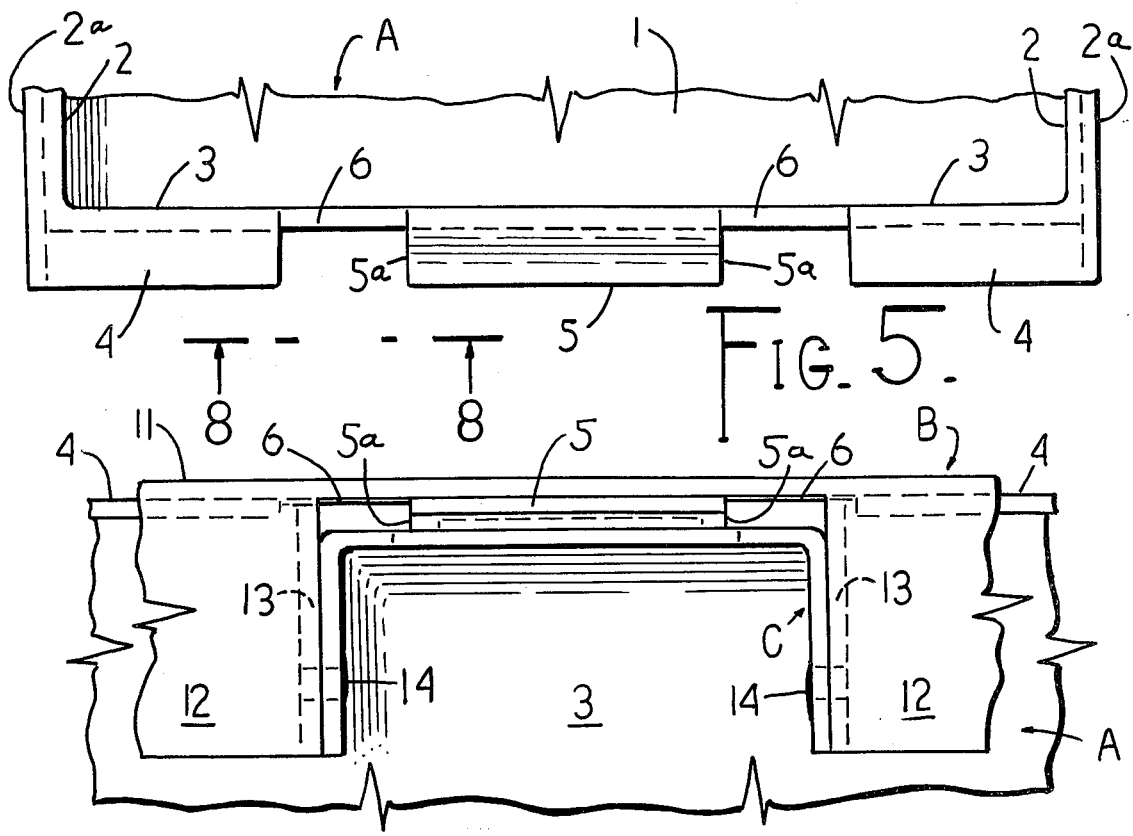
FIG. 5.
FIG. 6.
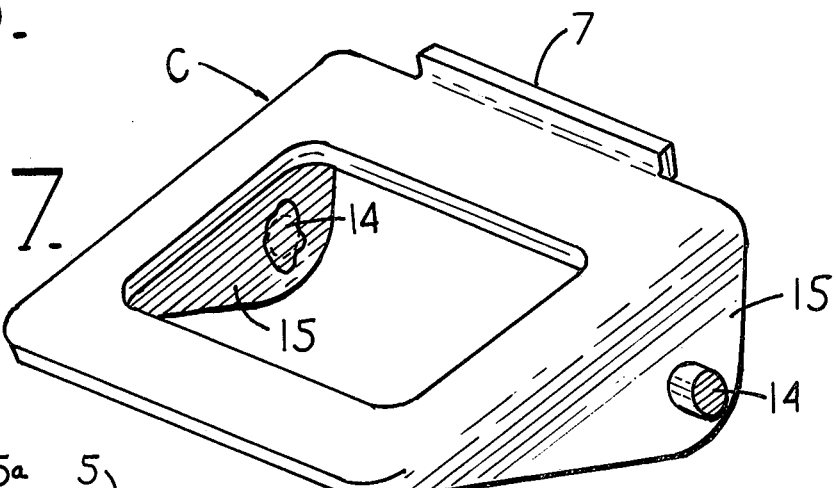
FIG. 7.
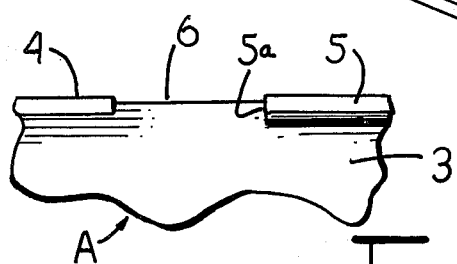
FIG. 8.

DOUBLE PAN UTENSIL FOR BAKING CAKES WITH WATER INSULATION HELD BETWEEN THE SPACED APART SIDE WALLS OF THE TWO PANS

BACKGROUND OF THE INVENTION

Field of the Invention. The standard metal cake pan has its bottom and side walls made from a single metal sheet. During the baking of the cake, the oven heat will cause the side walls of the pan to become heated sufficiently to melt the exposed grease or shortening on the inner surfaces of the side walls that lie above the sides of the batter that contacts the pan with the result that the sides of the batter will be browned prematurely and the batter sides cannot rise uniformly with the central portion of the batter during the baking of the cake. The result will be that the central portion of the cake batter will rise more than the sides and this will give a crown effect to the baked cake. If a multilayered cake is being made, the crown portion of the cake must be cut off so as to evenly support the flat undersurface of the next higher layer.

A further difficulty arises from the fact that the side walls of the cake pan were heated by the oven heat before the cake batter had completed rising and this caused the premature melting of the shortening on the inner side of the pan resulting in a non-lubrication of the side walls and a hindering of the ready rising of the cake batter that contacted the non-lubricated and heated side walls.

The present invention discloses an outer and an inner pan and the space between the side walls of the inner and outer pans is filled with water which functions as a heat insulation for the inner wall. The novel locking means that secures the two pans together also holds the inner pan in a position where its bottom wall contacts the bottom wall of the outer pan and prevents any water coming between these two bottom walls. The result is that in the baking of a cake, the bottom wall of the inner pan will be heated to a greater extent than the side walls of the inner pan because these side walls are insulated from the oven heat due to their being surrounded by a layer of water that functions as an insulating medium for the inner wall.

It should be understood that although the drawings show both the inner and outer pans as being rectangular in shape, my invention is well adapted to be used in inner and outer pans that have circular side walls.

SUMMARY OF THE INVENTION

An object of my invention is to provide a double pan utensil for baking cakes in which the side walls of the inner pan are spaced from the corresponding side walls of the outer pan so that water can be received between the two sets of side walls and function as a heat insulation for the side walls of the inner pan.

A further object of my invention is to provide novel locking means between the two pans that will hold the bottom of the inner pan in contact with the bottom of the outer pan to prevent any water from entering between the two pan bottoms. The result will be that the inner pan will have its side walls insulated from the oven heat while the bottom of the inner pan will be heated to a higher degree than its side walls because this bottom is held in direct heat conductive contact with the bottom wall of the outer pan. Another novel feature of my invention is that as soon as the locking means between the two pans are released after the baking of the cake is completed, the water surrounding the side walls of the inner pan will flow under the bottom of the inner pan causing it to float and be lifted to a position with respect to the outer pan that it can be readily lifted therefrom.

BRIEF DESCRIPTION OF THE DRAWINGS

FIG. 1 is a top plan view of the double pan utensil with a portion of the inner pan cut away to illustrate the combined handle and locking means that holds the two pans together.

FIG. 2 is a transverse vertical section through both pans and is taken along the line 2—2 of FIG. 1.

FIG. 3 is an enlarged vertical section taken along the line 3—3 of FIG. 1 which illustrates in detail the handle with its locking means in pan locking position.

FIG. 4 is a view similar to FIG. 3, but shows the handle and locking means swung into pan releasing position.

FIG. 5 is a horizontal section taken along the line 5—5 of FIG. 4 to illustrate a plan view of one end of the outer pan with its disposed cam-shaped flange that forms one part of the pan locking means. This Figure also shows the cut out areas which function as pressure relief openings to permit the escape of any steam generated from the water in the outer pan during the baking process.

FIG. 6 is a vertical transverse section taken along the line 6—6 of FIG. 3 and through the handle portion of the pan locking means and illustrates how the handle with its pan locking means is pivotally secured to a downwardly extending portion of a flange of the inner pan that overlies the outwardly extending flange of the outer pan. The end view of the handle is shown in elevation in this Figure.

FIG. 7 is an isometric view of the handle and an integral catch that constitutes one of the parts of the locking means and which is designed to engage with the cam-shaped flange when the handle is swung into a locking position.

FIG. 8 is a side elevation of a portion of the inner pan when looking in the direction of the arrows 8—8 of FIG. 5 and illustrates one of the cut out areas in the flange of the inner pan to permit the escape of any steam that might be generated from the body of water in the outer pan during the baking process.

DESCRIPTION OF THE PREFERRED EMBODIMENT

In carrying out my invention I provide a cake baking utensil composed of two pans, an outer pan, indicated generally at A in FIGS. 1 and 2, and an inner pan indicated generally at B. Although I illustrate both of the pans A and B as being rectangular in shape, it is possible to have both pans with cylindrical side walls rather than the polygon shape of the side walls for the rectangular pans. My invention can be used on either type of pan although the drawings illustrate only the rectangular pans.

Again referring to FIGS. 1 and 2, I show the outer pan A as having a bottom 1, side walls 2 and end walls 3. The side and end walls 2 and 3, respectively, extend at right angles to the bottom 1. The upper edges of the side walls 2 terminate in rolled over beaded portions 2a, see especially FIG. 2. Each end wall 3 has two outwardly extending flanges 4 that are spaced apart.

FIG. 1 illustrates this feature and further shows a centrally disposed keeper 5, corrugated in cross section, see FIG. 3, whose side edges 5a are spaced from the inner side edges of the flanges 4 so as to provide pressure relief areas 6 for the escape of any steam that might be generated from the heated water. This will be explained more fully later. The flanges 4, centrally disposed keeper 5, and the pressure relief areas 6 are shown in enlarged detail in FIG. 5, 6 and 8, while a cross section through the corrugated keeper 5 is shown in FIGS. 3 and 4. It will be noted that in cross section the corrugated keeper 5 has a double curved portion to provide a groove 5b which will receive a catch 7 of a pivoted handle indicated generally at C, see FIGS. 6 and 7. The keeper 5 and the catch 7 on the handle C, form a latch for removably securing the two pans together.

Before describing the handle C in detail, it is best first to set forth the construction of the inner pan B, see FIGS. 1, 2, 3, 4 and 6. This inner pan has a bottom 8, inclined side walls 9 and inclined end walls 10. The end walls 10 have outwardly extending flanges 11 that overlie the flanges 4 and the centrally disposed cam-shaped flanges 5 of the outer pan A, see especially FIGS. 3 and 4. Referring to FIG. 6, it will be noted that the outer ends of the flanges 11 are bent downwardly at 12. Then midway between the ends of the downwardly bent portion 12, a cut out is made and a pair of ears 13 extend inwardly from the sides of the cut out parallel each other to pivotally receive at 14 the handle C. The isometric view of the handle C illustrates how the handle has two depending sides 15 that parallel each other and carry the pivot pins 14 which are pivotally received in mating openings provided in the ears 13.

The inclined side walls 9 of the inner pan B have laterally extending flanges 16 that overlie the beaded edges 2a of the side walls 2 of the outer pan A, see FIG. 2. The outer edges of the flanges 16 are beaded at 16a, see also FIG. 1 and they contact the beaded edges 16a to act as a centering means for spacing the walls 9 of the inner pan inwardly from the adjacent side walls 2 of the outer pan.

When the inner pan B is placed within the outer pan A, the handles C will be in their open position as shown in FIG. 4. The inner portion of the handle C will be moved between the spaced apart flanges 4 of the outer pan A and the catch 7 of the handle will clear the outer edge of the corrugated keeper 5 as the inner pan is lowered within the outer pan A, see also FIG. 1. The handles C are swung into operative position as soon as the bottom 8 of the inner pan B contacts the outer pan bottom 1 and this will move the catches 7 under the corrugated keepers 5 until they are received in the grooves 5b of these keepers, see FIG. 3. Before this is done water is added to the outer pan A up to the level of a water marker 17 made on the outer pan, see FIG. 2. The moving of the inner pan B downwardly into the outer pan A will force the water in the outer pan A in an upward direction until the water surrounds all four walls 9 and 10 of the inner pan up to the level indicated in FIG. 2. In this way all four walls of the inner pan are insulated by a layer of water while the bottom wall 8 is in direct contact with the bottom wall 1 of the outer pan A. Therefore, when the double pan utensil is placed in an oven, the bottom wall 8 of the inner pan will be heated to a higher degree than the walls 9 and 10 of the inner pan because the walls are insulated by the water layer. The catches 7 when in locked position in the grooves 5b will space the end walls 10 of the inner pan B inwardly from the adjacent end walls 3 of the outer pan. These catches 7 of the handles C serve the additional purpose of holding the inner pan from floating on the water in the outer pan. It is possible to use both handles in lifting the double pan utensil as a unit without any danger of the two pans accidentally separating from each other.

OPERATION

From the foregoing description of the various parts of the device the operation thereof will be readily understood. The cake batter D is placed in the inner pan B, as indicated in FIG. 2, and then the pan is placed within the outer pan A in the manner already described and after water has been added to the outer pan up to the water mark 17. The inner pan has had its bottom and walls greased with shortening or other desired grease and then the cake batter has been added.

The double pan utensil is placed in a heated oven by means of the handles C. If the walls of the inner pan were not insulated by the layer of water, these walls would be heated too rapidly by the oven heat and the shortening on these walls would melt with the result that the sides of the batter D would not rise because these sides would be baked too soon. The center of the batter would rise and the final baked cake would have a pronounced crown effect on its top as indicated by the dash lines 18 of FIG. 2.

If the walls 9 and 10 of the inner pan are properly insulated by the layer of water surrounding these walls, the shortening or other grease on these walls will not melt prematurely when the utensil with its cake batter D is placed in the oven and there will be a uniform rising of the cake batter throughout its entire area during the baking process. The sides of the batter can rise at the same rate as the center of the batter and, therefore, the cake when baked will have a flat top as indicated by the straight line 19 in FIG. 2.

When the cake is baked the double pan utensil can be lifted from the handle by means of handles C. Then the handles C can be swung downwardly in order to free the catches 7 from the corrugated keepers 5 and the water in the outer pan A will cause the inner pan to float in the water and to raise the flanges 11 and 16 of the inner pan above the adjacent flanges 4 of the outer pan. It is now a simple matter to remove the inner pan, with its baked cake, from the outer pan that still holds the hot water. It should be remembered that during the baking of the cake, any steam that might be generated from the water in the outer pan A will escape through the pressure relief areas 6 in the outer pan provided for this purpose. FIG. 4 shows an inclined dash line 20 contacting the outer edge of the flange 11. Both handles C assume this position when the operator lifts the handles for lifting only the inner pan B from the outer pan A.

I claim:

1. A two pan cake baking utensil comprising:
   a. an outer pan for holding water and having a bottom and side and end walls, said end walls having centrally disposed and outwardly extending keepers with transversely extending grooves in their undersurfaces;
   b. an inner pan for holding cake batter and insertable into said outer pan so that the bottom of the inner pan will contact with the bottom of the outer pan, said inner pan having horizontal end flanges overlying said keepers when the inner pan is nested within said outer pan;

c. the portions of said horizontal end flanges that are disposed laterally of said keepers when the pans are nested having downwardly bent integral extensions so that there are a pair of spaced apart extensions at each end of said inner pan that straddle said keepers;

d. the inner end of each extension having an inwardly bent ear that extends at right angles to the plane of said end flanges so that each end of said inner pan will have a pair of spaced apart ears straddling their adjacent keeper of the outer pan, when the pans are nested;

e. a handle pivotally mounted between and supported by each pair of ears, the pivotal axis of each handle paralleling the axis of the groove in the underside of the adjacent keeper;

f. each keeper having an integral upturned catch adapted to enter the groove of the adjacent keeper when the pans are nested, each catch forcing its keeper against the undersurface of the end flange of said inner pan when said handle is swung into operative position and holding the bottom of the inner pan in contact with the bottom of the outer pan;

g. whereby said handles when in operative position will secure the inner pan to the outer pan and will maintain the bottoms of both pans in contact with each other and will also space the end walls of the inner pan from the adjacent end walls of the outer pan, the side walls of the inner pan having laterally extending flanges that overlie the side walls of the outer pan and the lateral flanges on the side walls of the inner pan having beaded edges engaging with the adjacent edges of the outer pan side walls for spacing the side walls of the inner pan from the side walls of the outer pan so that water in the outer pan will surround the side and end walls of the inner pan and act as insulation.

2. The combination as set forth in claim 1; and in which a. the length of each keeper being such that when said handles are swung into inoperative position, the catches on the handles will clear the keepers and will permit the removal of the inner pan from the outer pan.

* * * * *